(No Model.)

H. C. WEEDEN.
WATER CLOSET CONNECTION.

No. 299,605. Patented June 3, 1884.

WITNESSES.
J. Henry Taylor.
M. J. Lowe.

INVENTOR.
Henry C. Weeden
by Alex. P. Browne
attorney

UNITED STATES PATENT OFFICE

HENRY C. WEEDEN, OF BOSTON, MASSACHUSETTS.

WATER-CLOSET CONNECTION.

SPECIFICATION forming part of Letters Patent No. 299,605, dated June 3, 1884.

Application filed January 12, 1884. (No model.)

*To all whom it may concern:*

Be it known that I, HENRY C. WEEDEN, of Boston, in the county of Suffolk and State of Massachusetts, a citizen of the United States, have invented certain new and useful Improvements in Water-Closet Connections, of which the following is a specification.

My present invention relates to improvements in apparatus for securing an earthenware basin or hopper of a water-closet with a lead trap at their respective points of junction; and it has for its object to provide an improved connection of the character and for the purposes described.

Figure 1:
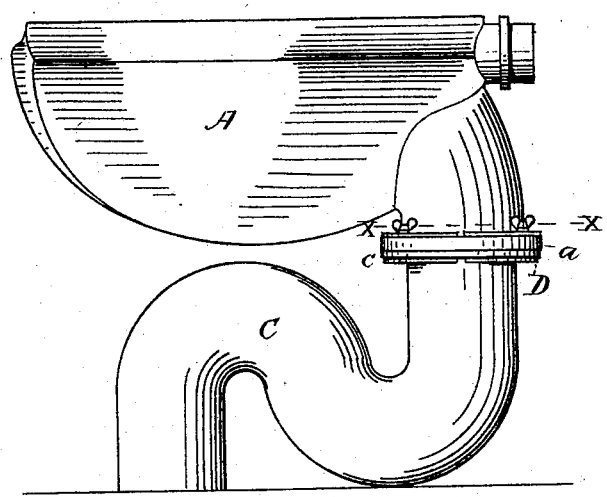
Figures 2, 3:
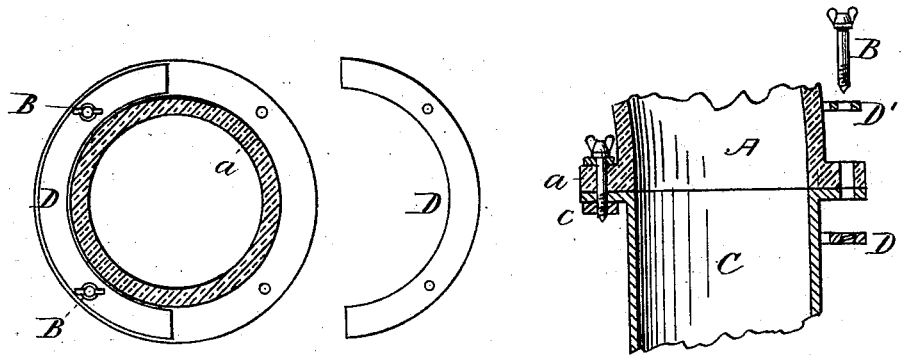
Figure 4:
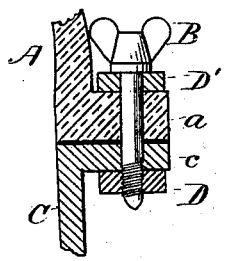

In the accompanying drawings, Figure 1 is an elevation showing such a hopper and trap united at their point of junction in a manner embodying my invention. Fig. 2 is a horizontal sectional view on the line x x of Fig. 1, and also a view of the segmental stay-plate. Fig. 3 is a vertical section of a hopper and trap at their point of junction, illustrating the manner of forming the joint and the component parts thereof, and Fig. 4 is an enlarged view in section of the form of joint shown in Fig. 3.

That part of the earthenware basin A through which its contents pass out is provided with an annular flange, $a$, containing a number of holes, preferably three or four, passing through the said flange. These holes are formed when the basin is molded and are of proper size to admit the passage through them of the clamping-screws B, and these clamping-screws are made gimlet-pointed, for a purpose hereinafter set forth. The opposed extremity of the lead trap C is also provided with an annular collar, $c$, which abuts against the collar of the basin when the trap and basin are in position, as shown in Fig. 1. When it is desired to unite the basin and trap, the gimlet-pointed clamping-screws are inserted in the holes in the earthenware collar $a$, and by means of their gimlet-point driven through the opposed lead collar $c$, on the under side of which are placed segmental or quadrantal stay-plates D. These stay-plates are formed of metal, preferably of brass, and each has a circular screw-threaded aperture which receives the end of the clamping-screw after it has passed through the lead collar, and thus acts to retain the clamping-screw, and to give it a good bearing upon the under surface of the soft metal of the collar $c$. By the means above described I obtain a tight joint of the earthenware bowl and lead trap in a convenient, expeditious, and economical manner.

In addition to the perforated screw-threaded clamping-plate D, which is placed on the under side of the lead collar $c$, as above explained, a second clamping-plate, D', of substantially the same shape and material as the plate D first mentioned, may, if desired, be employed upon the upper side of the earthenware collar $a$, and its construction is illustrated at Fig. 1. The perforations through this upper plate need, obviously, not be screw-threaded. The drawings also show both this plate D' and the plate D as covering half the annular extent of the collar, and each provided with two holes or perforations. It is obvious that instead of this arrangement, which I prefer on account of its convenience, a separate segmental plate may be employed for each clamping-screw that is used. Thus, in the form shown in the drawings, for the plate D, and the plate D', as well, may, if desired, be substituted two quadrantal segmental plates—one for each clamping-screw; or three clamping-screws and three segmental plates may be employed.

I claim—

1. The combination, with an earthenware bowl, A, having the continuous perforated terminal flange $a$ integral with said bowl, of the lead trap C, having the continuous flange $c$ integral with said trap, of clamp-screws B, passing through the two flanges, and the suitably-perforated stay-plates D, adapted to engage with and hold said screws, all being constructed and arranged substantially as hereinbefore set forth.

2. The combination, with the earthenware bowl A, having the perforated flange $a$, and the lead trap C, having a corresponding unperforated flange $c$, of the gimlet-pointed clamping-screws B, and the suitably-perforated and screw-threaded segmental stay-plate D, all substantially as herein described and shown, and for the purposes set forth.

3. The combination of the earthenware closet or bowl A, having the perforated flange a, with the lead trap C, having a corresponding unperforated flange, c, the gimlet-pointed clamping-screw B, and the upper and lower clamping-segments D' and D, all substantially as herein specified, and for the purposes herein set forth.

In testimony whereof I have hereunto subscribed my name this 5th day of January, A. D. 1884.

HENRY C. WEEDEN.

Witnesses:
J. HENRY TAYLOR,
JAMES F. BLIGH.